United States Patent [19]
Chang

[11] Patent Number: 5,938,740
[45] Date of Patent: Aug. 17, 1999

[54] PROGRAMMABLE PERIPHERAL CONTROL DEVICE FOR CONTROLLING PERIPHERALS OF A COMPUTER SYSTEM

[75] Inventor: Ming-Chih Chang, Taipei, Taiwan

[73] Assignee: Primax Electronics Ltd., Taiwan

[21] Appl. No.: 08/837,535

[22] Filed: Apr. 21, 1997

[51] Int. Cl.$^6$ .................................................. G06F 13/00
[52] U.S. Cl. .................................... 710/5; 710/8; 710/15; 710/62; 710/64; 710/72
[58] Field of Search ........................ 364/709.09, 709.11; 395/825, 842, 835, 828, 882, 884, 892, 182.03, 183.2

[56] References Cited

U.S. PATENT DOCUMENTS

| | | | |
|---|---|---|---|
| 4,908,612 | 3/1990 | Bromley et al. | 340/706 |
| 4,926,665 | 5/1990 | Stapley et al. | 70/277 |
| 5,111,423 | 5/1992 | Kopec, Jr. et al. | 395/500 |
| 5,220,522 | 6/1993 | Wilson et al. | 364/709.09 |
| 5,355,353 | 10/1994 | Kaiho | 369/13 |
| 5,652,741 | 7/1997 | Takagi | 369/32 |

*Primary Examiner*—Hassan Kizou
*Assistant Examiner*—Abu Hossain

[57] ABSTRACT

A peripheral control device of a computer system having programmable keys for recording frequently used procedures is disclosed. The computer system comprises a computer, a peripheral device connected to the computer, a peripheral control program for controlling the peripheral device, and a peripheral control device for controlling the peripherals of the computer. The peripheral control device comprises control keys for generating peripheral control signals, at least one programmable key for generating an execution signal, and a display device for displaying a message signal. The system further comprises a signal distribution program for transmitting the peripheral control signals to the peripheral control program and transmitting the message signal generated from the peripheral control program to the display device, a script file generation program for generating a script file for a programmable key, and a script file execution program for executing the designated script file. The script file is used for storing a peripheral control procedure.

8 Claims, 4 Drawing Sheets

PROGRAMMABLE PERIPHERAL CONTROL DEVICE FOR CONTROLLING PERIPHERALS OF A COMPUTER SYSTEM

BACKGROUND OF THE INVENTION

1. Field of the Invention

The present invention relates to a computer system having a peripheral control device, and more particularly, to a computer system having a programmable peripheral control device for recording frequently used procedures.

2. Description of the Prior Art

Products using peripheral control devices to control each peripheral device of the computer system can be found in present market. Generally, a peripheral control device comprises a display device and a plurality of control keys through which to control correspondent peripherals directly. However, such operation is quite inconvenient for controlling a plurality of peripheral devices or performing complex interactive operations of the peripherals. For example, if a user wants to scan a document and send it out through a modem, he/she has to use the control keys of a peripheral control device to control the scanner to scan a document into the computer first, and then use the control keys to control the modem to send out the document.

Since multiple interactive steps are usually involved in a complex control procedure, a user has to execute each command of the procedure one by one and he/she can not proceed to a next command until one command is completely executed. Such process is quite time consuming and inconvenient. Any mistake occurs in the middle of the process may cause the user to repeat the whole procedure again. And when repeating the whole procedure, the user has to repeat each step one by one all the times. Such situations substantially decrease the efficiency in using traditional peripheral control devices.

SUMMARY OF THE INVENTION

It is therefore a primary objective of the present invention to provide a programmable peripheral control device having a plurality of programmable keys for recording frequently used control procedures so that a user can utilize the peripheral control device more efficiently.

Briefly, in a preferred embodiment, the present invention includes a computer system with a programmable peripheral control device comprising:

(1) a computer having a memory for storing programs and a processor for executing programs;

(2) at least one peripheral device electrically connected to the computer for performing a peripheral function;

(3) at least one peripheral control program stored in the memory of the computer for controlling operations of the peripheral device to perform the peripheral function;

(4) a programmable peripheral control device electrically connected to the computer comprising:

(a) an input circuit having a plurality of control keys for generating correspondent control signals and at least one programmable key for generating an execution signal, (b) a display device for displaying a message signal, and (c) a control circuit for transmitting the signals generated from the input circuit to the computer and the message signal generated from the computer to the display device;

(5) a signal distribution program stored in the memory for receiving the peripheral control signals from the control circuit, transmitting the signals to correspondent peripheral control programs to control the operations of their correspondent peripherals, and also transmitting the message signals generated from the peripheral control programs to the control circuit of the control device to display them over the display device;

(6) a script file generation program stored in the memory of the computer for generating a script file of a programmable key to save a peripheral control procedure comprising peripheral control signals generated sequentially from the control keys of the input circuit through a user; and (7) a script file execution program stored in the memory of the computer for executing the designated script file according to an execution signal generated from a programmable key to complete the peripheral control procedure stored in the script file.

It is an advantage of the present invention that it provides a programmable peripheral control device having a plurality of programmable keys for recording frequently used control procedures so that a user can utilize the peripheral control device more efficiently by using the programmable keys to execute each control procedure.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
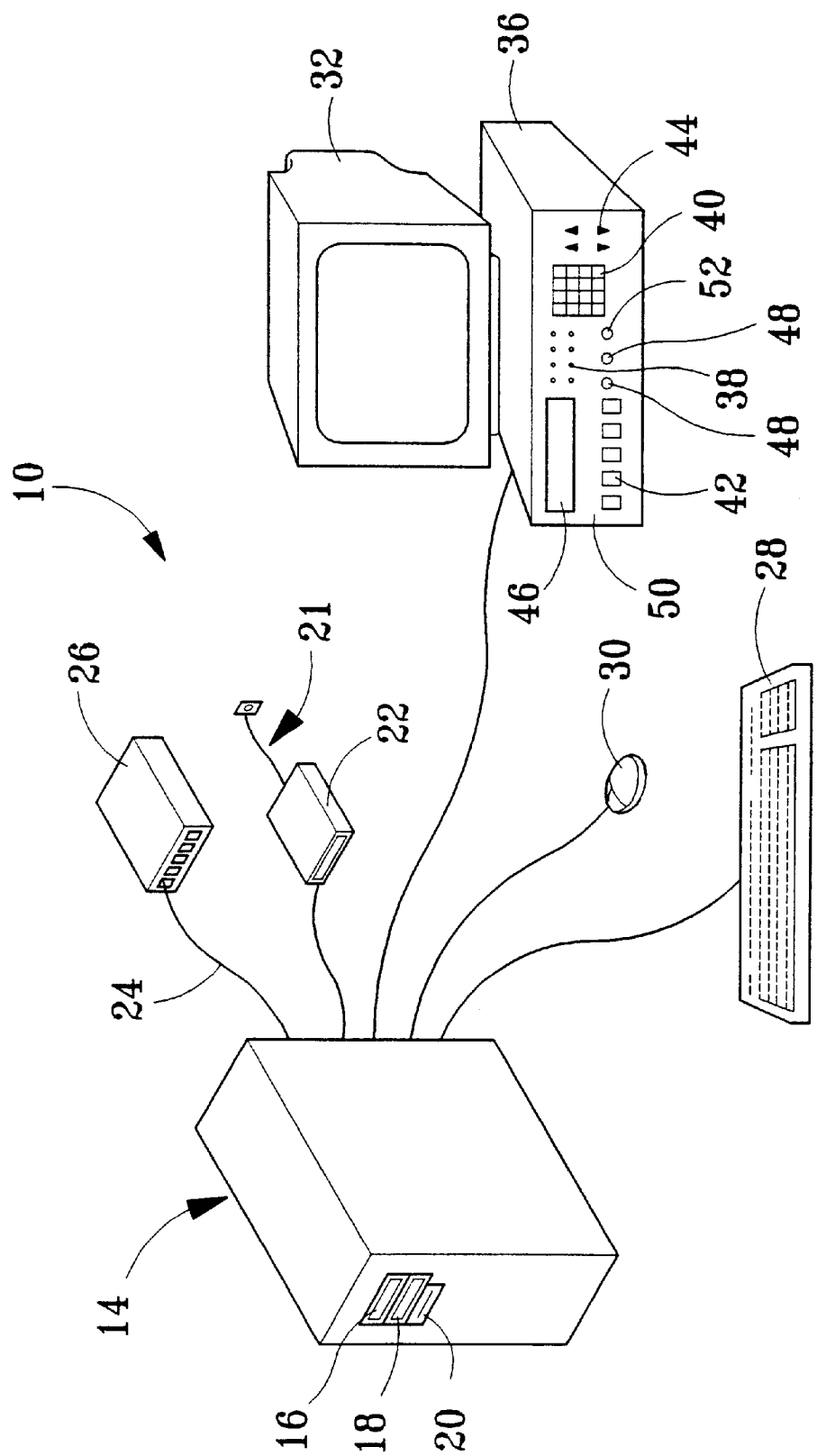
FIG. 1 is a perspective view of a computer system according to the present invention.

Please refer to FIG. 1. FIG. 1 is a perspective view of a computer system 10 according to the present invention. System 10 comprises a computer 14 having a CD-ROM 16, a scanner 18 and a floppy disk 20 installed in it, a monitor 32 electrically connected to the computer 14 for displaying video images or message signals, a modem 22 electrically connected to the computer 14 for transmitting digital data to a telephone network (not shown) through a telephone line 21, a network hub 26 electrically connected to the computer 14 through a network cable 24, a keyboard 28 and a mouse 30 electrically connected to the computer 14 for receiving data entered by a user, a programmable peripheral control device 36 electrically connected to the computer 14 for controlling various operations of the peripherals of system 10.

The programmable peripheral control device 36 comprises a control panel 50 installed with a display device 46 and a plurality of control keys. These control keys include: selection keys 38 for choosing different peripherals, numerical keys 40 for entering numbers, operation keys 42 for controlling the operations of the peripherals, and volume or speed buttons 44 for controlling the volume or speed of the peripherals. The control panel 50 further comprises a plurality of programmable keys 48 each for generating a correspondent execution signal and a program key 52 for generating a program signal.

Figure 2:
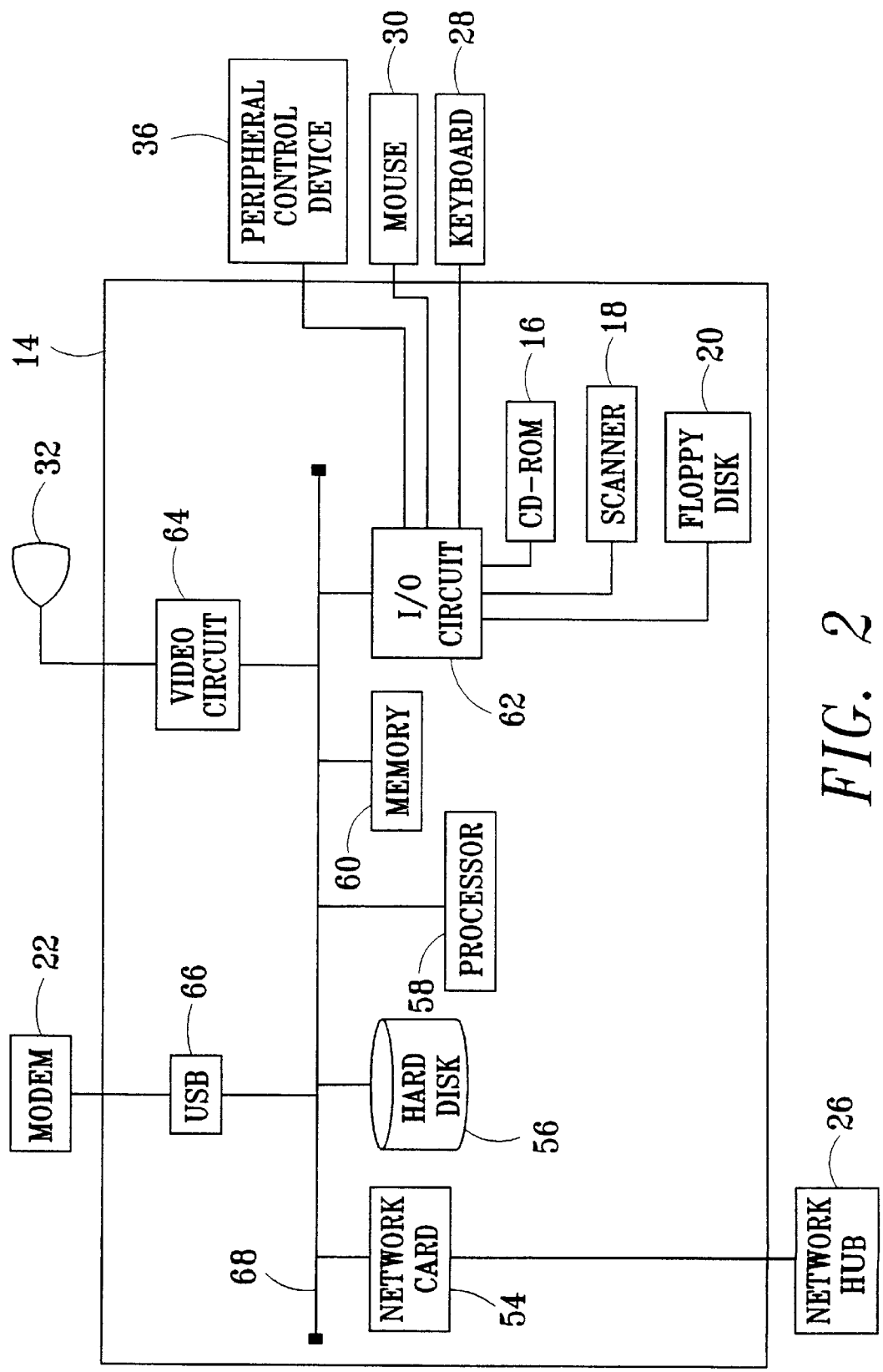
FIG. 2 is a function block diagram of the computer system shown in FIG. 1.

FIG. 2 is a function block diagram of the computer system 10. The computer 14 comprises a hard disk 56 for storing programs and data, a processor 58 for executing programs, a memory 60 for temporarily holding the programs or data executed by the processor 58, a network card 54 for connecting a network hub 26, an I/O circuit 62 for connecting various peripherals such as CD-ROM 16, scanner 18, floppy disk 20, keyboard 28, mouse 30 and peripheral control device 36, etc., a video circuit 64 for connecting the monitor 32, a USB (universal serial bus) circuit 66 for connecting the modem 22, an internal bus 68 for connecting all internal components of computer 14 such as network card 54, hard disk 56, processor 58, memory 60, I/O circuit 62, video circuit 64, USB circuit 66, etc. The internal bus 68 can be an ISA (industrial standard architecture) bus or other industrial standard buses. Peripherals such as CD-ROM 16, scanner 18, floppy disk 20 and modem 22 can be controlled according to the control signals generated from the peripheral control device 36 and also through each correspondent peripheral control program stored in the computer 14 to perform various kinds of peripheral functions. These will be further illustrated in FIG. 4.

Figure 3:
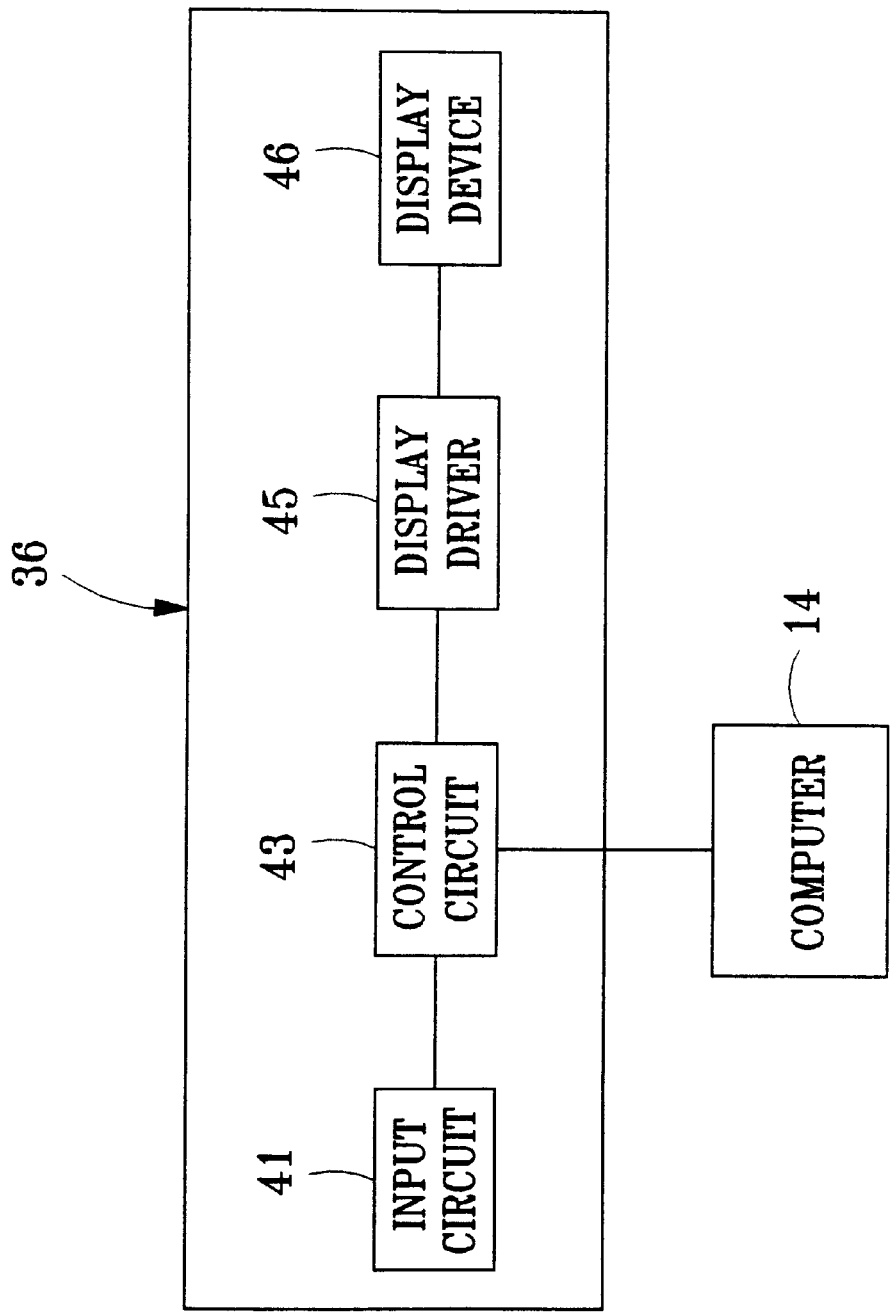
FIG. 3 is a function block diagram of a programmable peripheral control device.

FIG. 3 is a function block diagram of the programmable peripheral control device 36. The peripheral control device 36 comprises an input circuit 41, a control circuit 43, a display driver 45 and a display device 46 which is an LCD (liquid crystal device). The input circuit 41 is electrically connected to all the control keys of the control panel 50 shown in FIG. 1 and is used for generating various control signals according to user's inputs over these control keys. The control circuit 43 is used for transmitting the signals generated from the input circuit 41 to the computer 14 and for passing the message signals from the computer 14 to the display driver 45 so that they can be displayed over the display device 46. The control keys 38, 40, 42 and 44 connected to the input circuit 41 are used for entering various peripheral control procedures for controlling various peripherals. Each peripheral control procedure contains multiple peripheral control signals generated sequentially by using the control keys. Program key 50 is used for generating a program signal to activate a script file generation program 90 to store the peripheral control procedure entered by the user in a script file and designate it as the script file of a specific programmable key 48. A programmable key 48 is used for producing an execution signal to activate a script file execution program 92 for executing its designated script file. The script file generation program 90 and script file execution program 92 will be introduced in FIG. 4.

Figure 4:
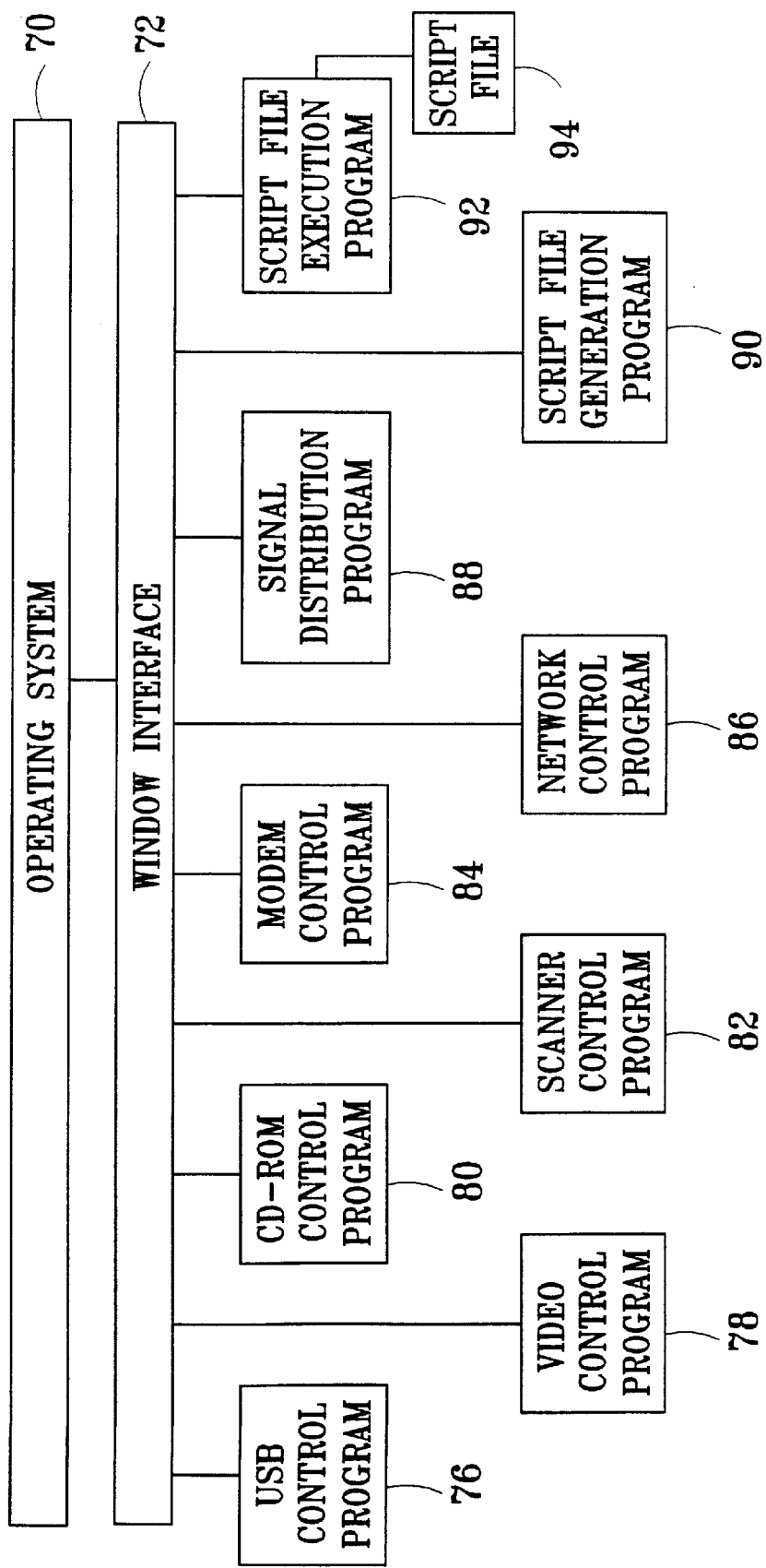
FIG. 4 is a software architecture diagram of the computer system shown in FIG. 1.

FIG. 4 is a software architecture diagram of the computer system 10 shown in FIG. 1. All the programs in this software architecture are stored in the hard disk 56 of the computer 14. When these programs are activated, the processor 58 will temporarily store them in the memory 60 for execution.

The software architecture comprises an operating system 70 for controlling the operations of the computer 14, a window interface 72 executed under the operating system 70 for supporting each application software executed under the window interface 72. The application software comprise a signal distribution program 88, a script file generation program 90, a script file execution program 92, and several peripheral control programs.

The signal distribution program 88 transmits peripheral control signals received from the control circuit 43 of the peripheral control device 36 to correspondent peripheral control programs 78, 80, 82 and 84 to control the operations of various peripheral devices, and transmit the message signals generated from the peripheral control programs to the control circuit 43 of the peripheral control device 36 to display them over the display device 46.

The peripheral control programs includes a USB control program 76 for controlling the USB circuit 66, a video control program 78 for controlling the operations of the video circuit 64 and the monitor 32 according to the video control signals transmitted from the signal distribution program 88, a CD-ROM control program 80 for controlling the operations of the CD-ROM 16 according to the CD-ROM control signals transmitted from the signal distribution program 88, a scanner control program 82 for processing scanner control signals transmitted from the signal distribution program 88 to control the operations of the scanner 18, a modem control program 84 for processing modem control signals transmitted from the signal distribution program 88 to control the operations of the modem 22, and a network control program 86 for processing network control signals transmitted from the signal distribution program 88 to control the network card 54. Each of the peripheral control programs can generate message signals interactively upon receiving the related control signals from the signal distribution program 88, and the signal distribution program 88 will send each message signal to the display device 46 of the peripheral control device 36 so that a user can interactively select required peripheral functions.

The script file generation program 90 is used for generating and designating the script file 94 of a programmable key 48. The script file 94 is used for storing a peripheral control procedure for controlling the peripheral(s) of the computer 14. Each procedure comprises a plurality of peripheral control signals sequentially generated by a user through the control keys of the peripheral control device 36. The script file execution program 92 is used for executing the designated script file 94 of a programmable key 48 according to an execution signal generated from the programmable key 48.

The setup procedure below is for illustrating how to generate and designate a script file 94 for a programmable key 48. It includes the following steps:

(1) press the program key 52 to activate the script file generation program 90 which will generate a script file immediately;

(2) press a programmable key 48 to generate an execution signal and transmit the execution signal to the script file generation program 90 so that it can designate the newly generated script file to the programmable key 48;

(3) generate a plurality of peripheral control signals sequentially by using the control keys of the peripheral control device 36;

(4) store the peripheral control signals sequentially into the script file; and (5) press the program key 52 again to complete the script file and terminate the execution of the script file generation program 90.

In step (1), after the user presses the program key 50, a program signal will be generated by the input circuit 41 of the peripheral control device 36 accordingly. The signal distribution program 88 will activate the script file generation program 90 upon receiving the program signal to execute the setup procedure described above. In step (2), the signal distribution program 88 will transmit the execution generated by the programmable key 48 to the script file generation program 90 instead activating the script file execution program 92 so that the newly generated script file can be designated correctly. In step (3), after the user sequentially enters the peripheral control signals for controlling the peripheral device operations, the signal distribution program 88 will transmit these peripheral control signals sequentially to the script file generation program 90 and also to the correspondent peripheral control programs so that the peripheral control procedure entered by the user can be executed. If there is any message signal generated by the peripheral control programs, it will be transmitted to the peripheral control device 36 so that it can be displayed over the display device 46 of the peripheral control device 36.

After creating the script file 94, a user can execute the peripheral control procedure stored in the script file 94 by simply pressing the designated programmable key 48. When the programmable key 48 is pressed, the input circuit 41 will generate a correspondent execution signal. Upon receiving the execution signal, the signal distribution program 88 will activate the script file execution program 92 to execute the script file 94 of the programmable key 48 until the peripheral control procedure stored inside is completed. The script file execution program 92 will distribute each control signal stored in the script file to correspondent peripheral control programs sequentially as if they are generated from the peripheral control device 36.

The display device 46 of the peripheral control device 36 can be substituted by using the monitor 32 of the computer 14 if a peripheral control device contains no such display device 46. In such a situation, the signal distribution program 88 will transmit all the message signals generated by the peripheral control programs to the video control program 78 so that they can be displayed over the monitor 32.

The setup procedure stated above allows frequently used peripheral control procedures be stored in script file format which can be repeated by using one of the programmable keys 48. Such design makes the peripheral control device 36 very easy to use in performing frequently used peripheral control procedures.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:
   (1) a computer having a memory for storing programs and a processor for executing programs;
   (2) at least one peripheral device electrically connected to the computer for performing a peripheral function;
   (3) at least one peripheral control program stored in the memory of the computer for controlling operations of the peripheral device to perform the peripheral function;
   (4) a peripheral control device electrically connected to the computer comprising:
      (a) an input circuit having a plurality of control keys for generating correspondent peripheral control signals and at least one programmable key for generating an execution signal,
      (b) a display device for displaying a message signal, and
      (c) a control circuit for transmitting the signals generated from the input circuit to the computer and the message signal generated from the computer to the display device;
   (5) a signal distribution program stored in the memory for transmitting each of the peripheral control signals received from the control circuit to a correspondent peripheral control program to control the operations of its correspondent peripheral device, and also transmitting the message signals generated from the peripheral control program to the display device of the peripheral control device;
   (6) a script file generation program stored in the memory of the computer for generating a script file for the programmable key to save a peripheral control procedure comprising a plurality of peripheral control signals sequentially generated by using the control keys of the input circuit; and
   (7) a script file execution program stored in the memory of the computer for executing the script file of the programmable key according to an execution signal generated by the programmable key to complete the peripheral control procedure stored in the script file.

2. The computer system of claim 1 wherein the input circuit further comprises a program key for generating a program signal and the signal distribution program will activate the script file generation program upon receiving the program signal to generate the script file.

3. A method for generating a script file for a computer system which comprises:
   (1) a computer having a memory for storing programs and a processor for executing programs;
   (2) at least one peripheral device electrically connected to the computer for performing a peripheral function;
   (3) at least one peripheral control program stored in the memory of the computer for controlling operations of the peripheral device to perform the peripheral function;
   (4) a peripheral control device electrically connected to the computer comprising:
      (a) an input circuit having a plurality of control keys for generating correspondent peripheral control signals and at least one programmable key for generating an execution signal,
      (b) a display device for displaying a message signal, and
      (c) a control circuit for transmitting the signals generated from the input circuit to the computer and the message signal generated from the computer to the display device; and
   (5) a signal distribution program stored in the memory for transmitting each of the peripheral control signals received from the control circuit to a correspondent peripheral control program to control the operations of its correspondent peripheral device, and also transmitting the message signals generated from the peripheral control program to the display device of the peripheral control device;

the method comprising:
   (1) generating a script file;
   (2) pressing a programmable key to generate the execution signal and designating the script file to the programmable key;
   (3) generating a plurality of peripheral control signals sequentially by using the control keys of the input circuit; and
   (4) storing the control signals sequentially in the script file.

4. The method of claim 3 wherein the input circuit further comprises a program key for generating a program signal and the computer system further comprises a script file generation program stored in the memory of the computer for generating the script file for the programmable key wherein the signal distribution program will initiate the script file generation program according to the program signal to generate the script file for the programmable key.

5. The setup method in claim 4 wherein after storing the control signals into the script file, the program key is pressed again to activate the script file generation program to complete the script file.

6. The method of claim 3 wherein the computer system further comprises a script file execution program stored in the memory of the computer for executing the script file according to an execution signal generated from the programmable key to complete the peripheral control procedure stored in the script file.

7. A computer system comprising:
   (1) a computer having a memory for storing programs, a processor for executing programs, and a monitor for displaying a message signal;
   (2) at least one peripheral device electrically connected to the computer for performing a peripheral function;
   (3) at least one peripheral control program stored in the memory of the computer for controlling operations of the peripheral device to perform the peripheral function;
   (4) a peripheral control device electrically connected to the computer comprising:
      (a) an input circuit having a plurality of control keys for generating correspondent peripheral control signals and at least one programmable key for generating an execution signal,
      (b) a control circuit for transmitting the signals generated from the input circuit to the computer;
   (5) a signal distribution program stored in the memory for transmitting each of the peripheral control signals received from the control circuit to a correspondent peripheral control program to control the operations of its correspondent peripheral device, and also for displaying the message signals generated from the peripheral control program over the monitor of the computer;
   (6) a script file generation program stored in the memory of the computer for generating a script file for the programmable key to save a peripheral control procedure comprising a plurality of peripheral control signals sequentially generated by using the control keys of the input circuit; and
   (7) a script file execution program stored in the memory of the computer for executing the script file of the programmable key according to an execution signal generated by the programmable key to complete the peripheral control procedure stored in the script file.

8. The computer system of claim 7 wherein the input circuit further comprises a program key for generating a program signal and the signal distribution program will activate the script file generation program upon receiving the program signal to generate the script file.

* * * * *